US011892642B2

United States Patent
Chang et al.

(10) Patent No.: US 11,892,642 B2
(45) Date of Patent: Feb. 6, 2024

(54) ELECTRONIC APPARATUS

(71) Applicant: HTC Corporation, Taoyuan (TW)

(72) Inventors: Li-Hsun Chang, Taoyuan (TW); Kuan-Ying Ou, Taoyuan (TW); Qing-Long Deng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 180 days.

(21) Appl. No.: 16/592,763

(22) Filed: Oct. 4, 2019

(65) Prior Publication Data
US 2020/0110270 A1 Apr. 9, 2020

Related U.S. Application Data

(60) Provisional application No. 62/741,551, filed on Oct. 5, 2018.

(51) Int. Cl.
*G02B 27/01* (2006.01)
*G02B 1/115* (2015.01)
*G02B 5/28* (2006.01)

(52) U.S. Cl.
CPC .......... *G02B 27/0176* (2013.01); *G02B 1/115* (2013.01); *G02B 27/0101* (2013.01); *G02B 27/0149* (2013.01); *G02B 27/0172* (2013.01); *A63F 2300/8082* (2013.01); *G02B 5/281* (2013.01); *G02B 2027/0178* (2013.01)

(58) Field of Classification Search
CPC ................ G02B 27/0176; G02B 1/115; G02B 27/0101; G02B 27/0149; G02B 27/0172; G02B 5/281; G02B 2027/0178; G02B 27/01; A63F 2300/8082
See application file for complete search history.

(56) References Cited

U.S. PATENT DOCUMENTS

| | | | | |
|---|---|---|---|---|
| 3,738,732 A | * | 6/1973 | Ikeda | G02B 1/115 428/432 |
| 6,819,469 B1 | * | 11/2004 | Koba | G03H 1/02 359/290 |
| 6,822,677 B1 | * | 11/2004 | Takahashi | H04N 9/735 348/223.1 |
| 10,423,000 B1 | * | 9/2019 | Ahuja | G02B 27/0172 |

(Continued)

FOREIGN PATENT DOCUMENTS

| | | |
|---|---|---|
| CN | 107209304 A | 9/2017 |
| CN | 108603958 A | 9/2018 |

(Continued)

OTHER PUBLICATIONS

Examiner provided machine translation of Chen et al., CN 108603958 A (Year: 2018).*

(Continued)

*Primary Examiner* — Balram T Parbadia
*Assistant Examiner* — Gabriel A Sanz
(74) *Attorney, Agent, or Firm* — CKC & Partners Co., LLC

(57) ABSTRACT

An electronic apparatus includes a housing and a covering structure. The housing has a light transmission portion. The covering structure includes a plurality of coating layers sequentially stacked above the light transmission portion. The coating layers respectively have different thicknesses, different refractive indices, different reflectivities, and different transmissivities. Reflected light of the coating layers presents a virtual image with a pattern.

15 Claims, 6 Drawing Sheets

(56) References Cited

U.S. PATENT DOCUMENTS

| | | | |
|---|---|---|---|
| 10,534,174 B2* | 1/2020 | Bouchier | G02B 27/0103 |
| 10,698,204 B1* | 6/2020 | Ouderkirk | G02B 27/0172 |
| 10,852,544 B1* | 12/2020 | Zhang | G02B 27/0172 |
| 2015/0002528 A1 | 1/2015 | Bohn et al. | |
| 2016/0154244 A1* | 6/2016 | Border | G06T 19/006 |
| | | | 359/630 |
| 2017/0184764 A1 | 6/2017 | Matsuyuki et al. | |
| 2018/0129056 A1 | 5/2018 | Nortrup et al. | |
| 2018/0182173 A1* | 6/2018 | Robaina | G02B 6/0068 |
| 2019/0094541 A1* | 3/2019 | Choi | G02B 27/0944 |

FOREIGN PATENT DOCUMENTS

| | | |
|---|---|---|
| JP | H04291221 A | 10/1992 |
| WO | 2005054928 A1 | 6/2005 |
| WO | 2016187609 A1 | 11/2016 |
| WO | 2018111895 A1 | 6/2018 |

OTHER PUBLICATIONS

Corresponding Chinese office action dated May 26, 2021.
Corresponding Taiwan office action dated Jan. 9, 2020.
Corresponding European search report dated Mar. 11, 2020.

* cited by examiner

ELECTRONIC APPARATUS

CROSS-REFERENCE TO RELATED APPLICATION

This application claims priority to U.S. Provisional Application Ser. No. 62/741,551, filed on Oct. 5, 2018, which is herein incorporated by reference.

BACKGROUND

Technical Field

The present disclosure relates to an electronic apparatus.

Description of Related Art

One of the rapidly growing technologies in the field of human-computer interaction is various head-mounted displays (HMDs), which may be worn on a user's head and have one or two displays in front of the user's eyes. This type of display has multiple commercial applications involving simulation of virtual reality including video games, medicine, sport training, entertainment applications, and so forth. In the gaming field, these displays may be used, for example, to render three-dimensional (3D) virtual game worlds.

Nowadays, computer vision methods, in particular, object tracking, are widely used in various applications. For example, object tracking may be used in a virtual reality (VR) system to detect the location of a handle held by a user. However, conventional VR systems often have tracking errors. One reason is that external visible light may easily affect the image sensor through the housing of the VR system. Another reason is that when the obtained image is converted to grayscale values, the grayscale values cannot be correctly matched with the scene, so the identification accuracy is low when feature points are identified by algorithm.

Accordingly, it is an important issue for the industry to provide an electronic apparatus capable of solving the aforementioned problems.

SUMMARY

An aspect of the disclosure is to provide an electronic apparatus that can efficiently solve the aforementioned problems.

According to an embodiment of the disclosure, an electronic apparatus includes a housing and a covering structure. The housing has a light transmission portion. The covering structure includes a plurality of coating layers sequentially stacked above the light transmission portion. The coating layers respectively have different thicknesses, different refractive indices, different reflectivities, and different transmissivities. Reflected light of the covering structure presents a virtual image with a pattern.

In an embodiment of the disclosure, the covering structure is configured to transmit most of light in a wavelength range of infrared spectrum and not to transmit most of light in a wavelength range of visible spectrum.

In an embodiment of the disclosure, the covering structure is configured to reflect said most of light in the wavelength range of the visible spectrum.

In an embodiment of the disclosure, the electronic apparatus further includes an infrared image sensor under the light transmission portion and configured to sense said most of light in the wavelength range of the infrared spectrum.

In an embodiment of the disclosure, the coating layers include a first coating layer, a second coating layer, and a third coating layer. The first coating layer is the farthest one of the coating layers relative to the light transmission portion. The second coating layer is connected to the first coating layer. The third coating layer is connected to the second coating layer. The refractive index of the second coating layer is smaller than the refractive indices of the first coating layer and the third coating layer.

In an embodiment of the disclosure, the covering structure is configured to transmit most of light in a first wavelength range of visible spectrum and not to transmit most of light in a second wavelength range of the visible spectrum which does not overlap with the first wavelength.

In an embodiment of the disclosure, the covering structure is configured to reflect said most of light in the second wavelength range of the visible spectrum.

In an embodiment of the disclosure, the electronic apparatus further includes an image sensor under the light transmission portion and has a detectable wavelength range. The detectable wavelength range is within the first wavelength range.

In an embodiment of the disclosure, the covering structure is configured not to transmit most of light in a third wavelength range of the visible spectrum which does not overlap with the first wavelength. The first wavelength range is between the second wavelength range and the third wavelength range.

In an embodiment of the disclosure, the covering structure is configured to reflect said most of light in the third wavelength range of the visible spectrum.

In an embodiment of the disclosure, the coating layers include a first coating layer, a second coating layer, and a third coating layer. The first coating layer is the farthest one of the coating layers relative to the light transmission portion. The second coating layer is connected to the first coating layer. The third coating layer is connected to the second coating layer. The refractive index of the second coating layer is greater than the refractive indices of the first coating layer and the third coating layer.

Accordingly, in the electronic apparatus of the present disclosure, the coating layers of the covering structure covered on the housing respectively have different thicknesses, different refractive indices, different reflectivities, and different transmissivities, so that reflected light of the covering structure can present a virtual image with a pattern to achieve the function of anti-counterfeiting. In addition, by adjusting the stacking order of the coating layers, most of light in a wavelength range of the visible spectrum can be reflected by the covering structure, the reflected light of the covering structure can produce a colorful color for recognition. In some embodiments of the present disclosure, the covering structure is configured to transmit most of light in a wavelength range of the infrared spectrum, so the infrared image sensor in the housing would not easily be affected by external visible light, and thus tracking errors can be effectively avoided. In some embodiments of the present disclosure, the covering structure is configured to transmit most of light in another wavelength range of the visible spectrum within which the detectable wavelength range of the image sensor in the housing is, so that the image obtained by the image sensor can be correctly matched with the scene, and thus tracking errors can also be effectively avoided.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
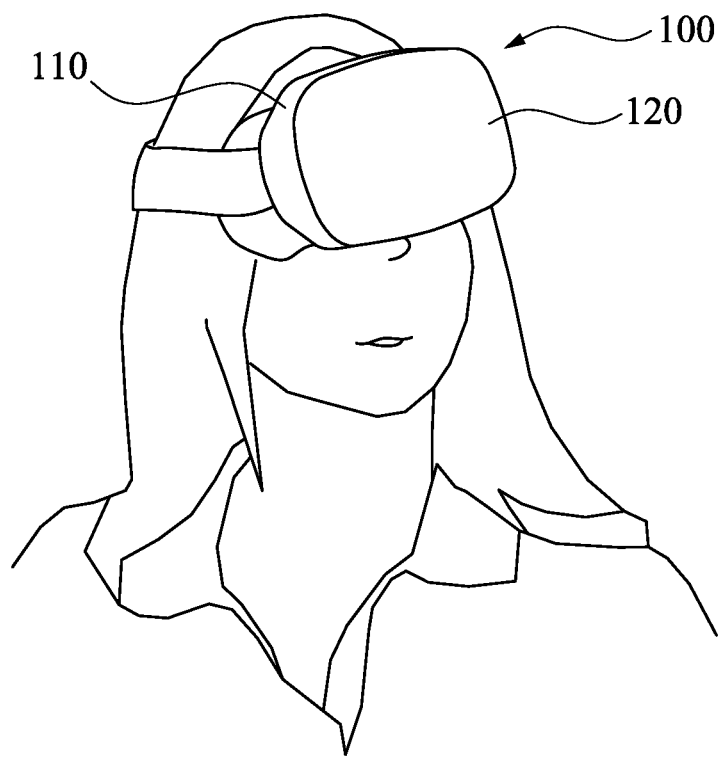
FIG. 1 is a schematic diagram illustrating a user using an electronic apparatus according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram illustrating a user using an electronic apparatus 100 according to some embodiments of the present disclosure. As shown in FIG. 1, the electronic apparatus 100 includes a housing 110 configured to be worn on the head of the user. The electronic apparatus 100 shown in FIG. 1 uses a head-mounted device as an example, but the disclosure is not limited in this regard. In some embodiments, the electronic apparatus 100 may communicate wirelessly (e.g., WiFi, Bluetooth, etc.) with a computing device. In some embodiments, the electronic apparatus 100 may be wired directly to the computing device or in communication with the computing device via a network (e.g., the Internet). For example, the computing device may be a server on a network that provides video or game services. In some embodiments, the electronic apparatus 100 is a game playing device and the game is executed directly on the electronic apparatus, without the need of an external device to run the game.

Figure 2:
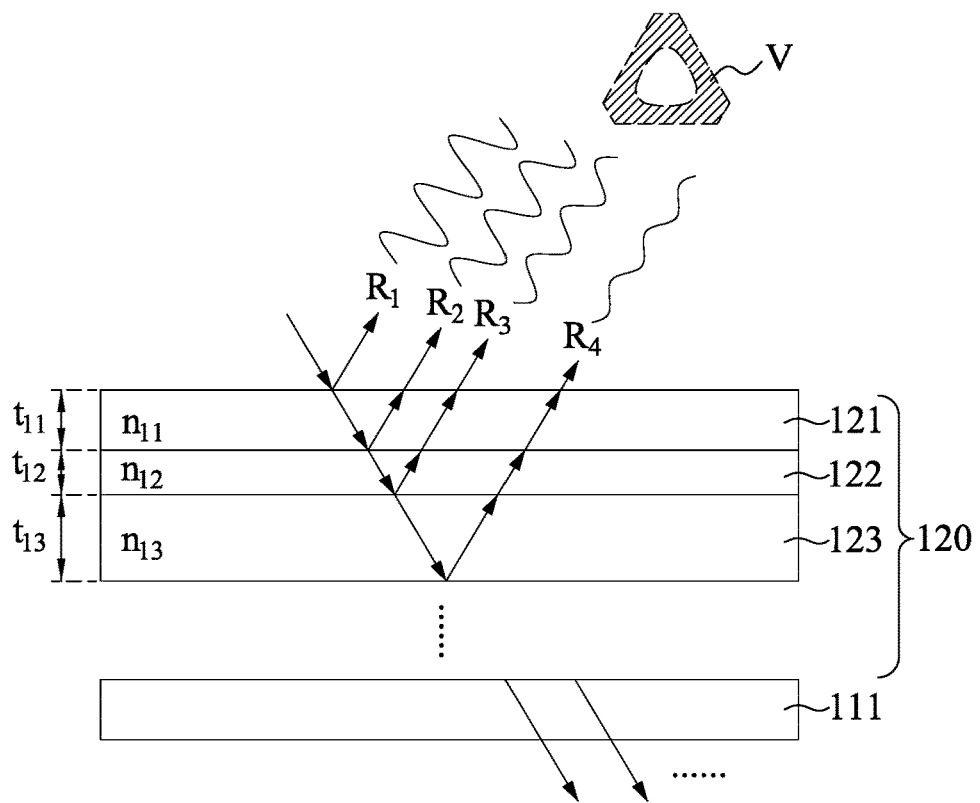
FIG. 2 is a schematic diagram illustrating transmitted light and reflected light of the electronic apparatus according to some embodiments of the present disclosure.
Figure 3:
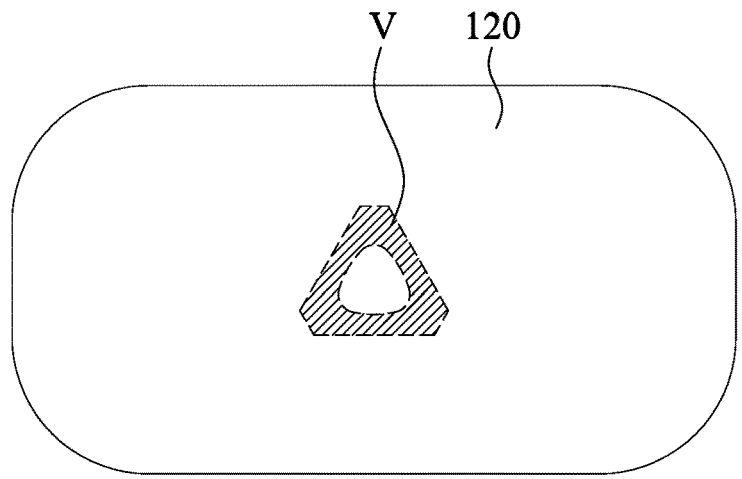
FIG. 3 is a front view of the electronic apparatus according to some embodiments of the present disclosure.

Reference is made to FIGS. 2 and 3. FIG. 2 is a schematic diagram illustrating transmitted light and reflected light of the electronic apparatus 100 according to some embodiments of the present disclosure. FIG. 3 is a front view of the electronic apparatus 100 according to some embodiments of the present disclosure. As shown in FIGS. 1 to 3, the housing 110 has a light transmission portion 111. The electronic apparatus 100 further includes a covering structure 120. The covering structure 120 includes a plurality of coating layers sequentially stacked above the light transmission portion 111. The coating layers respectively have different thicknesses (e.g., thicknesses $t_{11}$, $t_{12}$, and $t_{13}$), different refractive indices (e.g., refractive indices n11, n12, and n13), different reflectivities, and different transmissivities. Reflected light of the covering structure 120 presents a virtual image V with a pattern.

In some embodiments, to obtain virtual image V with the pattern, the optical wavefront of the pattern must be recalculated and measured. First, the phase only function of the pattern may be calculated using an algorithm (e.g., the Gerchberg-Saxton algorithm). According to the algorithm, after superimposing phase B on light (usually parallel light) emitted by a light source A, a bright and uniform desired pattern K can be obtained on a plane D through Fourier transform C (i.e., through a convex lens). The algorithm is to find out what phase B should be superimposed according to the desired pattern K, which is the calculation of the so-called hologram F.

In simple terms, the phase of each pixel can be found by optimizing the complex amplitude of each pixel, and iterative calculation can be performed. After a finite number of steps, the result will converge, which means that the complex amplitude calculated each time will not be much different. At this time we will find the desired phase bitmap.

In some embodiments, after the phase only function is obtained, the phase only function may be inputted into a spatial light modulator. In some embodiments, the pattern of the phase only function may be reconstructed and projected through a reconstruction system. In some embodiments, the optical wavefront of the pattern may be measured by a wavefront sensor (e.g., the Shack-Hartmann wavefront sensor). After the data of the optical wavefront of the pattern is obtained, the thicknesses of the coating layers can be determined.

Figure 4:
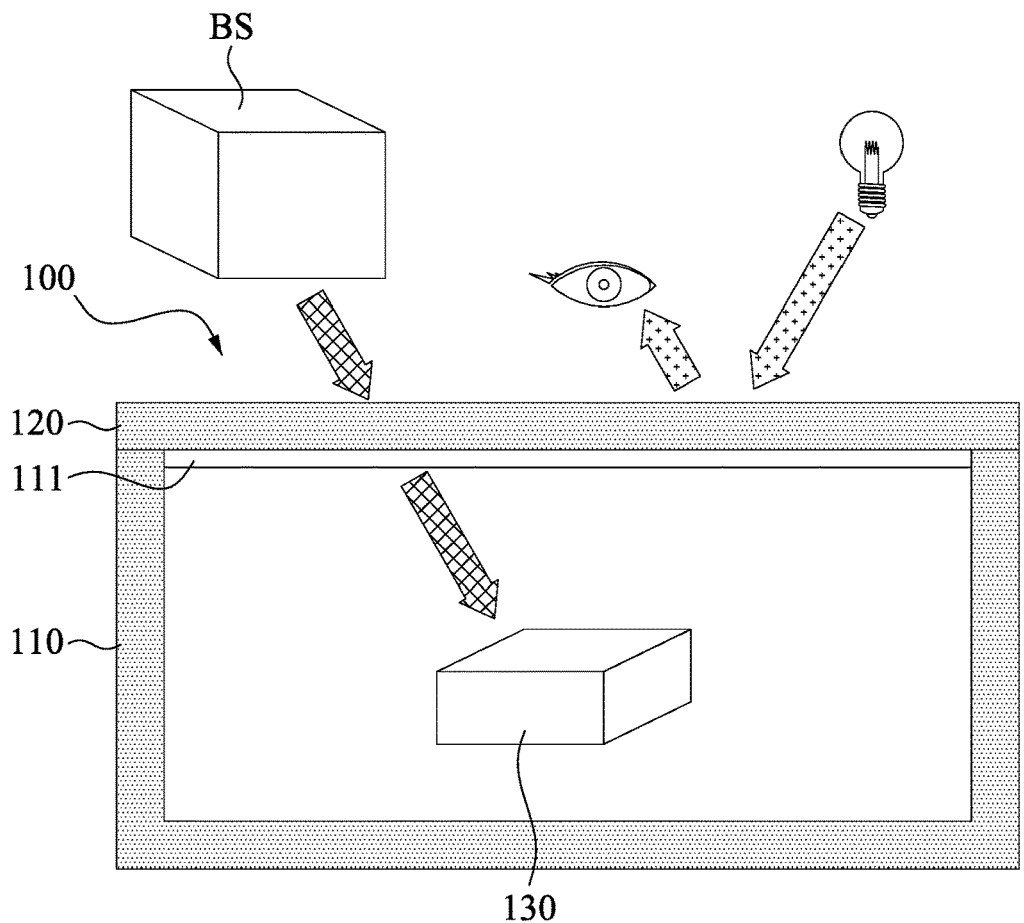
FIG. 4 is a schematic view of the electronic apparatus according to some embodiments of the present disclosure.
Figure 5:
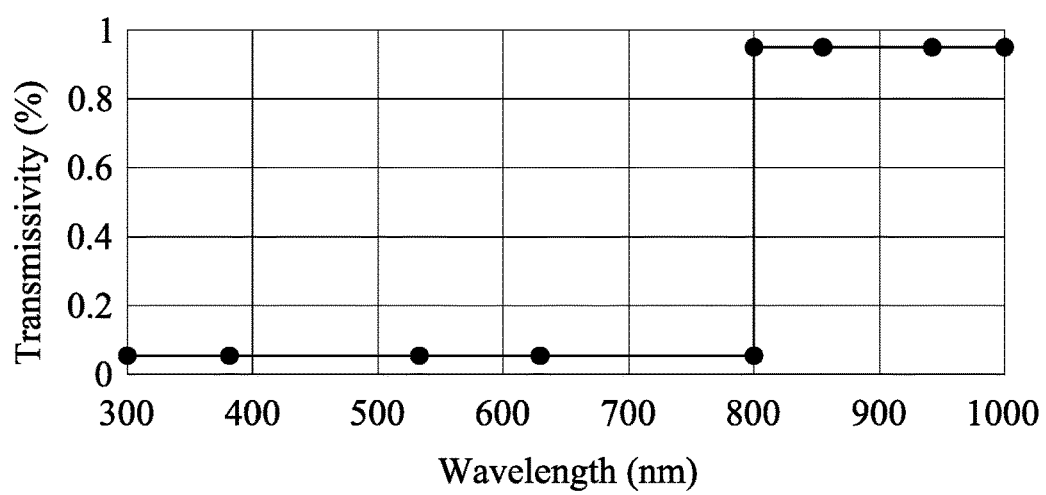
FIG. 5 is a schematic diagram of transmission spectrum of the covering structure of the electronic apparatus shown in FIG. 4 according to some embodiments of the present disclosure.

Reference is made to FIGS. 4 and 5. FIG. 4 is a schematic view of the electronic apparatus 100 according to some embodiments of the present disclosure. FIG. 5 is a schematic diagram of transmission spectrum of the covering structure 120 of the electronic apparatus 100 shown in FIG. 4 according to some embodiments of the present disclosure. As shown in FIGS. 4 and 5, the covering structure 120 is configured to transmit most of light in a wavelength range of the infrared spectrum and not to transmit most of light in a wavelength range of the visible spectrum. In some embodiments, the wavelength range of the infrared spectrum is greater than 800 nm, but the disclosure is not limited in this regard. In some embodiments, the wavelength range of the visible spectrum is from about 350 nm to about 799 nm, but the disclosure is not limited in this regard.

In some embodiments, the covering structure 120 is configured to reflect said most of light in the wavelength range of the visible spectrum. As such, the reflected light of the covering structure 120 can produce a colorful color for recognition. In some other embodiments, the covering structure 120 is configured to absorb said most of light in the wavelength range of the visible spectrum.

In some embodiments, as shown in FIG. 4, the electronic apparatus 100 further includes an infrared image sensor 130 under the light transmission portion 111 of the housing 110 and configured to sense said most of light in the wavelength range of the infrared spectrum. Since the covering structure 120 is configured to transmit said most of light in the wavelength range of the infrared spectrum, when an infrared base station BS outside the housing 110 transmits a signal, the signal can be mostly transmitted through the covering structure 120 and enter the housing 110 to be received by the infrared image sensor 130. Since the covering structure 120 is configured to reflect said most of light in the wavelength range of the visible spectrum, the visible light of the external environment is reflected outside the housing 110 by the covering structure 120. As such, the infrared image sensor 130 in the housing 110 would not easily be affected by external visible light and the tracking positioning accuracy can be greatly improved, and thus tracking errors can be effectively avoided.

In some embodiments, as shown in FIG. 2, the coating layers of the covering structure 120 includes a first coating layer 121, a second coating layer 122, and a third coating layer 123. The first coating layer 121 is the farthest one of the coating layers relative to the light transmission portion 111. The second coating layer 122 is connected to the first coating layer 121. The third coating layer 123 is connected to the second coating layer 122. The refractive index $n_{12}$ of the second coating layer 122 is smaller than the refractive index $n_{11}$ of the first coating layer 121 and the refractive index $n_{13}$ of the third coating layer 123.

In some embodiments, as shown in FIG. 2, the reflected light $R_1$, the reflected light $R_2$, the reflected light $R_3$, and the reflected light $R_4$ may have respective phases by making the thickness of each of the first coating layer 121, the second coating layer 122, and the third coating layer 123 be uniform. The phase of the reflected light $R_1$ is the same as that of the reflected light $R_2$, so the reflected light $R_1$ and the reflected light $R_2$ form a constructive interference. The phase of the reflected light $R_2$ is different from that of the reflected light $R_3$, so the reflected light $R_2$ and the reflected light $R_3$ form a destruction interference. The interference characteristics can be used to produce colorful color for recognition. As described above, by the condition that the coating layers are not equal in thickness, the covering structure 120 can present desired interference fringes (i.e., the virtual image V having the desired pattern), thereby achieving the function of anti-counterfeiting.

Figure 6:
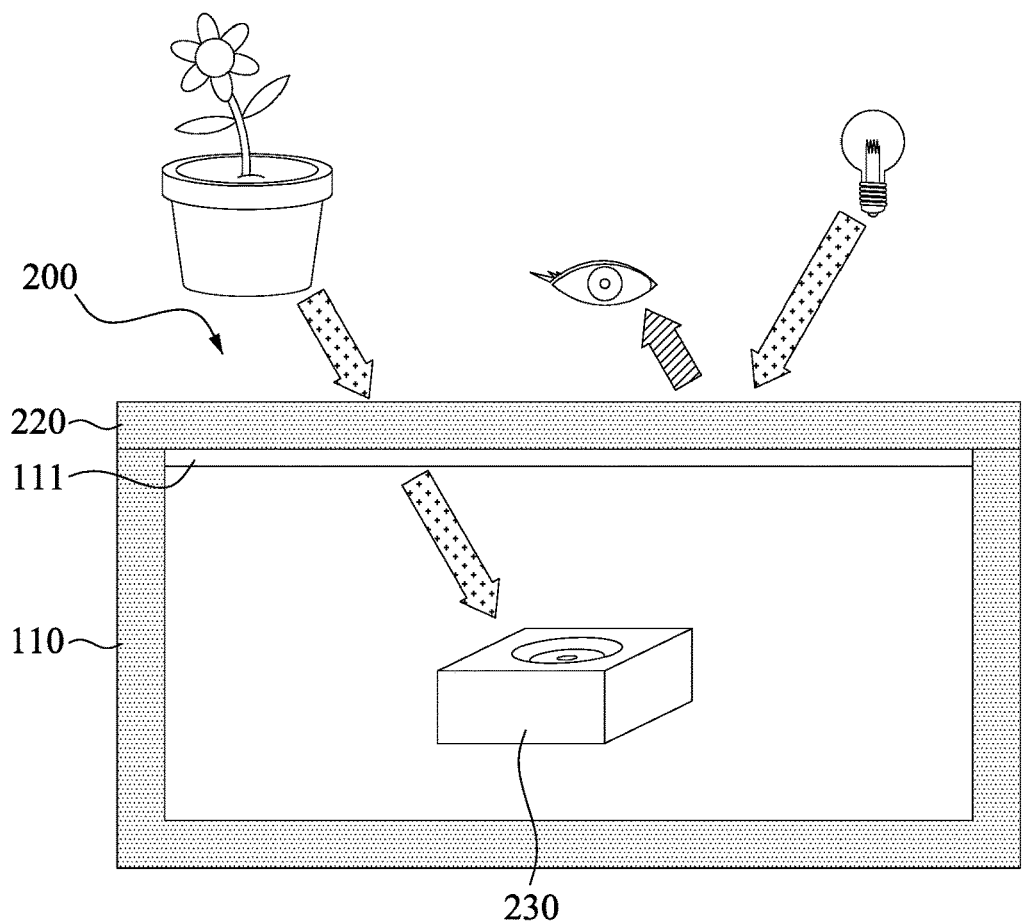
FIG. 6 is a schematic view of an electronic apparatus according to some embodiments of the present disclosure.
Figure 7:
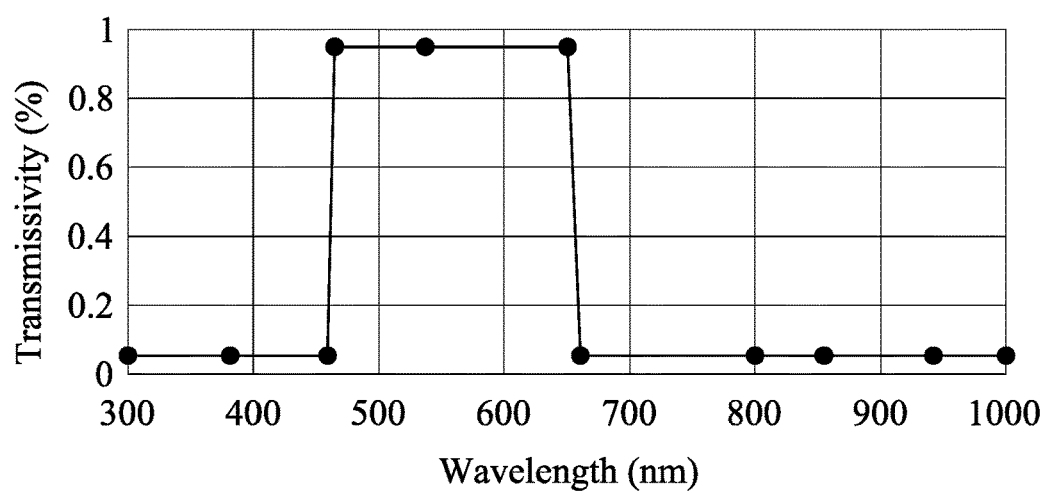
FIG. 7 is a schematic diagram of transmission spectrum of the covering structure of the electronic apparatus shown in FIG. 6 according to some embodiments of the present disclosure.
Figure 8:
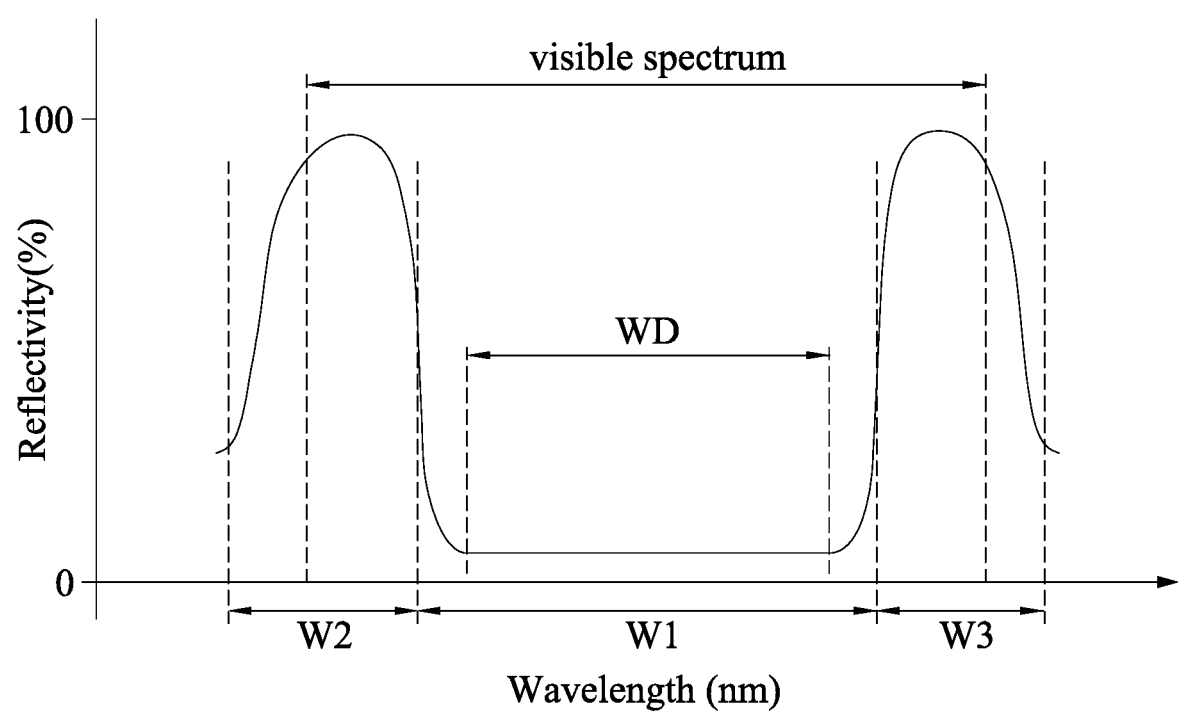
FIG. 8 is a schematic diagram of reflection spectrum of the covering structure of the electronic apparatus shown in FIG. 6 according to some embodiments of the present disclosure.

Reference is made to FIGS. 6, 7, and 8. FIG. 6 is a schematic view of an electronic apparatus 200 according to some embodiments of the present disclosure. FIG. 7 is a schematic diagram of transmission spectrum of the covering structure 220 of the electronic apparatus 200 shown in FIG. 6 according to some embodiments of the present disclosure. FIG. 8 is a schematic diagram of reflection spectrum of the covering structure 220 of the electronic apparatus 200 shown in FIG. 6 according to some embodiments of the present disclosure. As shown in FIGS. 6 to 8, the electronic apparatus 200 includes the housing 110 and the covering structure 220. The housing 110 of the present embodiment is identical to or similar to that of the embodiment as shown in FIG. 4, so it can be referred to above related description and would not be repeated here for simplicity. The covering structure 220 includes a plurality of coating layers sequentially stacked above the light transmission portion 111. The coating layers respectively have different thicknesses (e.g., thicknesses $t_{21}$, $t_{22}$, and $t_{23}$), different refractive indices (e.g., thicknesses $n_{21}$, $n_{22}$, and $n_{23}$), different reflectivities, and different transmissivities. Reflected light of the covering structure 220 presents a virtual image V with a pattern which may be illustrated by FIG. 3.

In some embodiments, as shown in FIG. 7, the covering structure 220 is configured to transmit most of light in a first wavelength range W1 of the visible spectrum and not to transmit most of light in a second wavelength range W2 and most of light in a third wavelength range W3 of the visible spectrum which do not overlap with the first wavelength range W1.

In some embodiments, the first wavelength range W1 is between the second wavelength range W2 and the third wavelength range W3. In some embodiments, the first wavelength range W1 of the visible spectrum is from about 460 nm to about 650 nm, but the disclosure is not limited in this regard. In some embodiments, the second wavelength range W2 of the visible spectrum is smaller than about 460, but the disclosure is not limited in this regard. In some embodiments, the third wavelength range W3 of the visible spectrum is greater than about 650 nm, but the disclosure is not limited in this regard.

In some embodiments, the covering structure 220 is configured to reflect at least one of said most of light in the second wavelength range W2 and said most of light in the third wavelength range W3 of the visible spectrum. As such, the reflected light of the covering structure 220 can produce a colorful color for recognition. In some other embodiments, the covering structure 220 is configured to absorb at least one of said most of light in the second wavelength range W2 and/or said most of light in the third wavelength range W3 of the visible spectrum.

In some embodiments, as shown in FIG. 6, the electronic apparatus 200 further includes an image sensor 230 under the light transmission portion 111 and has a detectable wavelength range WD. The detectable wavelength range W1 is within the first wavelength range WD. Since the covering structure 220 is configured to transmit most of light in a first wavelength range W1 of the visible spectrum and reflect at least one of said most of light in the second wavelength range W2 and said most of light in the third wavelength range W3 of the visible spectrum, the image sensor 230 can obtain the accurate wavelength energy through the covering structure 220, so that the obtained image has higher contrast and the feature points of the image are sharper. Then, more accurate tracking and positioning can be achieved through depth algorithm.

Figure 9:
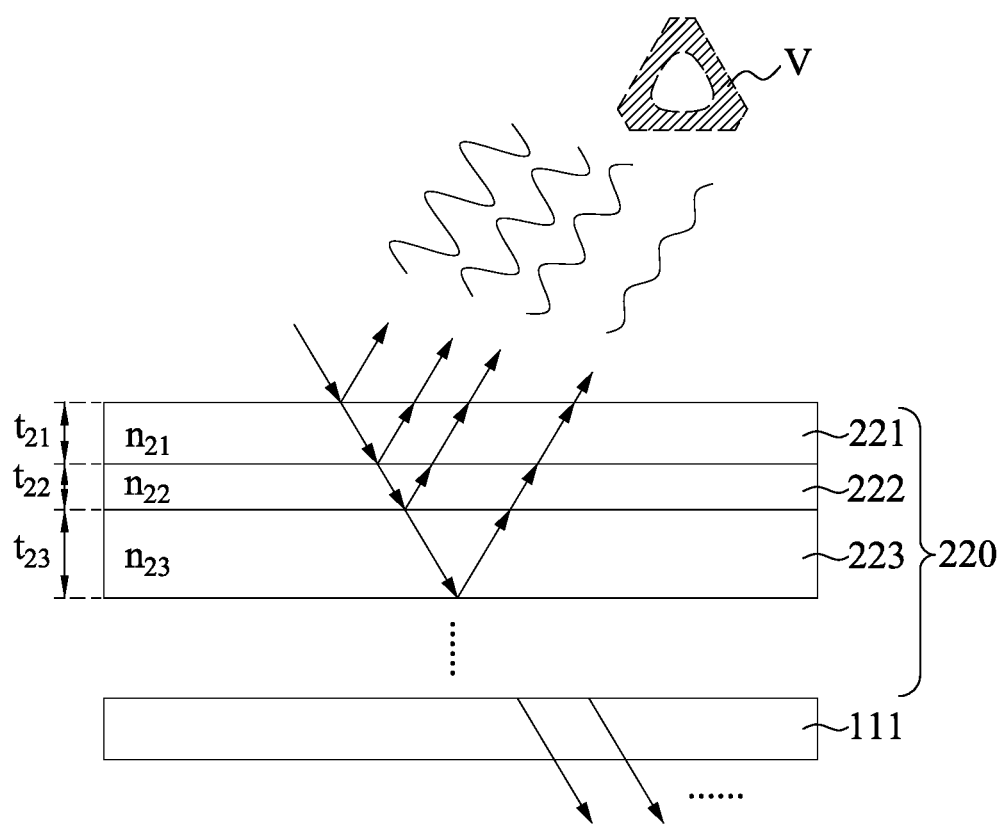
FIG. 9 is a schematic diagram illustrating transmitted light and reflected light of the electronic apparatus shown in FIG. 6 according to some embodiments of the present disclosure.

Reference is made to FIG. 9. FIG. 9 is a schematic diagram illustrating transmitted light and reflected light of the electronic apparatus 200 shown in FIG. 6 according to some embodiments of the present disclosure. As shown in FIG. 9, the coating layers include a first coating layer 221, a second coating layer 222, and a third coating layer 223. The first coating layer 221 is the farthest one of the coating layers relative to the light transmission portion 111. The second coating layer 222 is connected to the first coating layer 221. The third coating layer 223 is connected to the second coating layer 222. The refractive index $n_{22}$ of the second coating layer 222 is greater than the refractive index $n_{21}$ of the first coating layer 221 and the refractive index $n_{23}$ of the third coating layer 223.

According to the foregoing recitations of the embodiments of the disclosure, it can be seen that in the electronic apparatus of the present disclosure, the coating layers of the covering structure covered on the housing respectively have different thicknesses, different refractive indices, different reflectivities, and different transmissivities, so that reflected light of the covering structure can present a virtual image with a pattern to achieve the function of anti-counterfeiting. In addition, by adjusting the stacking order of the coating layers, most of light in a wavelength range of the visible spectrum can be reflected by the covering structure, the reflected light of the covering structure can produce a colorful color for recognition. In some embodiments of the present disclosure, the covering structure is configured to transmit most of light in a wavelength range of the infrared spectrum, so the infrared image sensor in the housing would not easily be affected by external visible light, and thus tracking errors can be effectively avoided. In some embodiments of the present disclosure, the covering structure is configured to transmit most of light in another wavelength range of the visible spectrum within which the detectable wavelength range of the image sensor in the housing is, so that the image obtained by the image sensor can be correctly matched with the scene, and thus tracking errors can also be effectively avoided.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic apparatus, comprising:
   a housing having a light transmission portion; and
   a covering structure comprising a plurality of coating layers sequentially stacked above the light transmission portion, the coating layers respectively having different thicknesses, different refractive indices, different reflectivities, and different transmissivities, wherein the thickness of each of the coating layers is uniform and reflected lights respectively of the coating layers have respective phases, such that the reflected lights form interference fringes to present a virtual image with a pattern, wherein a source of the reflected lights is external to the housing, and the virtual image with the pattern formed by the reflected lights is presented external to the housing, wherein the covering structure is configured to transmit most of light in a wavelength range of infrared spectrum and not to transmit most of light in a wavelength range of visible spectrum.

2. The electronic apparatus of claim 1, wherein the covering structure is configured to reflect said most of light in the wavelength range of the visible spectrum.

3. The electronic apparatus of claim 1, further comprising an infrared image sensor under the light transmission portion and configured to sense said most of light in the wavelength range of the infrared spectrum.

4. The electronic apparatus of claim 1, wherein the coating layers comprises a first coating layer being the farthest one of the coating layers relative to the light transmission portion, a second coating layer connected to the first coating layer, and a third coating layer connected to the second coating layer, and the refractive index of the second coating layer is smaller than the refractive indices of the first coating layer and the third coating layer.

5. The electronic apparatus of claim 1, wherein the covering structure is configured to transmit most of light in a first wavelength range of visible spectrum and not to transmit most of light in a second wavelength range of the visible spectrum which does not overlap with the first wavelength range.

6. The electronic apparatus of claim 5, wherein the covering structure is configured to reflect said most of light in the second wavelength range of the visible spectrum.

7. The electronic apparatus of claim 5, further comprising an image sensor under the light transmission portion and having a detectable wavelength range, wherein the detectable wavelength range is within the first wavelength range.

8. The electronic apparatus of claim 5, wherein the covering structure is configured not to transmit most of light in a third wavelength range of the visible spectrum which does not overlap with the first wavelength range, and the first wavelength range is between the second wavelength range and the third wavelength range.

9. The electronic apparatus of claim 8, wherein the covering structure is configured to reflect said most of light in the third wavelength range of the visible spectrum.

10. The electronic apparatus of claim 5, wherein the coating layers comprises a first coating layer being the farthest one of the coating layers relative to the light transmission portion, a second coating layer connected to the first coating layer, and a third coating layer connected to the second coating layer, and the refractive index of the second coating layer is greater than the refractive indices of the first coating layer and the third coating layer.

11. The electronic apparatus of claim 1, wherein the coating layers comprise a first coating layer, a second coating layer, and a third coating layer, the reflected lights respectively of the first and second coating layers form a constructive interference, and the reflected lights respectively of the second and third coating layers form a destruction interference.

12. The electronic apparatus of claim 1, wherein the thicknesses of the coating layers are determined by data of optical wavefront of the pattern measured from a projection projected based on a phase only function of the pattern.

13. An electronic apparatus, comprising:
    a housing having a light transmission portion; and
    a covering structure comprising at least three coating layers sequentially stacked above the light transmission portion, the coating layers respectively having reflected lights, different thicknesses, different refractive indices, different reflectivities, and different transmissivities, wherein the thickness of each of the coating layers is uniform;
    wherein the covering structure is configured to transmit most of light in a wavelength range of infrared spectrum and to reflect most of light in a wavelength length range of visible spectrum;
    wherein at least a pair of the reflected lights have a same phase so that said at least a pair of the reflected lights constructively interfere, and at least another pair of the reflected lights have a different phase so that said another pair of the reflected lights destructively interfere, such that interference fringes are formed to present a virtual image with a pattern; and wherein:
the three coating layers comprise a first coating layer, a second coating layer, and a third coating layer;
the reflected lights comprise a first reflected light reflected from the first coating layer and having a first phase, a second reflected light reflected from the second coating layer and having a second phase, and a third reflective light reflected from the third coating layer and having a third phase;
the first phase is the same as the second phase, such that the first and second reflected lights constructively interfere; and
the second phase is different from the third phase, such that the second and third reflected lights destructively interfere.

14. The electronic apparatus of claim 13, wherein said most of light in a wavelength range of infrared spectrum is transmitted inwardly into the housing, and said most of light in a wavelength range of visible spectrum is reflected outwardly of the housing.

15. The electronic apparatus of claim 13, wherein the third coating layer is closest to the light transmission portion, the first coating layer is farthest from the light transmission portion, and the second coating layer is positioned between the first and third coating layers.

* * * * *